(12) United States Patent
Humphrey et al.

(10) Patent No.: US 10,894,337 B2
(45) Date of Patent: Jan. 19, 2021

(54) METHOD AND FORMULATION FOR THE TREATMENT OF TIMBER

(71) Applicant: ARCH WOOD PROTECTION PTY LTD, Tullamarine (AU)

(72) Inventors: David Humphrey, Tullamarine (AU); Brett Skewes, Tullamarine (AU); Shane McFarling, Tullamarine (AU)

(73) Assignee: ARCH WOOD PROTECTION PTY LTD, Tullamarine (AU)

( * ) Notice: Subject to any disclaimer, the term of this patent is extended or adjusted under 35 U.S.C. 154(b) by 43 days.

(21) Appl. No.: 15/547,654

(22) PCT Filed: Feb. 4, 2016

(86) PCT No.: PCT/AU2016/000027
§ 371 (c)(1),
(2) Date: Jul. 31, 2017

(87) PCT Pub. No.: WO2016/123655
PCT Pub. Date: Aug. 11, 2016

(65) Prior Publication Data
US 2018/0021974 A1    Jan. 25, 2018

(30) Foreign Application Priority Data

Feb. 4, 2015   (AU) ................................. 2015900334

(51) Int. Cl.
*B27K 3/46*   (2006.01)
*A01N 61/02*  (2006.01)
(Continued)

(52) U.S. Cl.
CPC ............... *B27K 3/46* (2013.01); *A01N 61/02* (2013.01); *B27K 5/0075* (2013.01); *C08K 5/42* (2013.01);
(Continued)

(58) Field of Classification Search
CPC .................................... B27K 3/44; B27K 3/46
See application file for complete search history.

(56) References Cited

U.S. PATENT DOCUMENTS 4,732,817 A   3/1988   Lotz et al.
5,098,472 A   3/1992   Watkins et al.
(Continued)

FOREIGN PATENT DOCUMENTS

| AU | 2014202283 | 11/2014 |
|---|---|---|
| WO | WO 1987/003783 | 7/1987 |
| WO | WO 2010/148450 | 12/2010 |

OTHER PUBLICATIONS

International Search Report and Written Opinion PCT/UA2016/000027, dated Mar. 30, 2016.

*Primary Examiner* — Peter F Godenschwager
(74) *Attorney, Agent, or Firm* — Dority & Manning, P.A.

(57) ABSTRACT

According to the present invention there is provided a method of treating timber with a creosote-containing preservative formulation adapted for use at substantially ambient temperature. The formulation comprises: creosote; one or more surfactants such that when diluted with a predetermined quantity of water, the creosote is present as an oil-in-water macroemulsion or microemulsion; and optionally, an anti-foaming agent and/or a fire retardant. It is found empirically that the inventive concentrate allows for the use of creosote, a known-effective biocide, without many of the drawbacks inherent in such use.

21 Claims, 2 Drawing Sheets

(51) Int. Cl.
*C08K 5/42* (2006.01)
*C08L 91/00* (2006.01)
*C08L 95/00* (2006.01)
*B27K 5/00* (2006.01)

(52) U.S. Cl.
CPC ............ *C08L 91/00* (2013.01); *C08L 95/005* (2013.01); *B27K 2240/20* (2013.01); *C08L 2555/62* (2013.01)

(56) References Cited

U.S. PATENT DOCUMENTS

| | | | | |
|---|---|---|---|---|
| 2012/0148859 | A1* | 6/2012 | Cobham | ................ A01N 25/04 428/541 |
| 2014/0329014 | A1* | 11/2014 | Cobham | ................ A01N 25/04 427/297 |

* cited by examiner (Invention)　　　　　　　　　(Prior art)

METHOD AND FORMULATION FOR THE TREATMENT OF TIMBER

RELATED APPLICATION

This application claims priority from PCT/AU2016/000027, filed on Feb. 4, 2016 and Australian patent application 2015900334, filed on Feb. 4, 2015. The content of the priority applications are incorporated herein by reference in their entirety.

FIELD OF THE INVENTION

The present invention relates to the treatment of wood products and other cellulosic formulations with a preservative formulation. More specifically, the invention relates to developments in respect of creosote—a wood preservation agent that although used historically, has been largely superseded by more modern preservative agents due to its many inherent disadvantages. Although the invention will be described hereinafter with reference to this application, it will be appreciated that it is not limited to this particular field of use.

BACKGROUND OF THE INVENTION

Any discussion of the prior art throughout the specification should in no way be considered as an admission that such prior art is widely known or forms part of the common general knowledge in the field.

Wood is a staple construction formulation used throughout the world. However, it is prone to degradation from elements including the natural environment, weather events, insects, rot and fire. Accordingly, a range of chemical treatments has been developed to improve the durability and working lifetime of wooden structures.

To treat and prevent infestations, timber is often impregnated with a preservative such as a fungicide or insecticide. The preservative is typically present in a carrier, with the mixture being applied to the surface of the timber, for example by dipping, spraying, brushing or pressure treatment, such that the carrier and preservative are absorbed in to the timber.

The treatment of timber or timber products with preservative compounds involves the introduction of stable chemicals into the cellular structure of the timber. This, in turn, protects the timber from hazards such as fungi, insects and other wood-destroying organisms. Preservative treatments may also include the introduction of chemicals that improve resistance to degradation by fire.

In Australia, the treatment of timber is governed by the Australian standard "AS 1604.1-2012". Hazard Class H4 defines "severe decay, borers and termites, fence posts, greenhouses, pergolas (in ground and landscaping timbers)". The timber is in contact with the ground or is continually damp so there is a severe decay hazard. The treatment stops attack by insects, including termites, and severe decay. Typical examples of timber applications in an H4 environment are fence posts, greenhouses, pergolas (in ground) and landscaping timbers.

Hazard class H5 is defined as "sawn lumber, round wood and plywood used in exterior situations that come into contact with the ground and have extreme decay hazards or the end use requires greater protection". The treatment stops attack by very severe decay, borers and termites. Examples include retaining walls, piling, house stumps, building poles and cooling tower fill.

"Penetration" is defined under the H4/H5 Standards as: "[a]ll preservative-treated wood shall show evidence of distribution of the preservative in the penetration zone in accordance with the following requirements: (a) If the species of timber used is of natural durability class 1 or 2, the preservative shall penetrate all the sapwood. Preservative penetration of the heartwood is not required; (b) If the species of timber used is of natural durability class 3 or 4, the preservative shall penetrate all of the sapwood and, in addition one of the following requirements shall apply; (b(i)) Where the lesser cross-sectional dimension is greater than 35 mm, the penetration shall be not less than 8 mm from any surface. Where the lesser cross-sectional dimension is equal or less than 35 mm, the penetration shall be not less than 5 mm from any surface; and (b(ii)) Unpenetrated heartwood shall be permitted, provided that it comprises less than 20% of the cross-section of the piece and does not extend more than halfway through the piece from one surface to the opposite surface and does not exceed half the dimension of the side in the cross-section on which it occurs".

It is emphasised that the H4/H5 Standards referenced above are Australian Standards reflective of local Australian usage and environmental conditions. It will be appreciated that other countries may have their own Standards in relation to treated timber for specific end uses.

The preservatives commonly used in timber treatment can be characterised according to the carrier vehicle used to carry preservatives into the timber, and by the active chemicals protecting against the various hazards.

As mentioned above, a carrier must be used in order to facilitate penetration of the preservative into the timber. As shown in the Australian Standards, the carriers presently available can be characterised broadly as "water-borne" or "solvent-borne" systems.

A carrier must be capable of providing sufficient penetration of the preservative into the wood, thereby to provide an effective barrier against infestation. Other considerations in the choice of carrier include the desired rate of penetration, cost, environmental, health and safety considerations. A carrier may provide for a "complete penetration" formulation, or for an "envelope penetration" formulation in which a defined migration of one or more preservatives into the wood is achieved.

The final step in the preservation process is often that a solvent, if used in or as the carrier, must then be removed before the timber is made available for use. One of the most commonly-used carriers is water, although it does have perceptible drawbacks in respect of swelling, solubility and osmotic gradients in wet wood.

Creosote is the portion of chemical products obtained by the distillation of a tar that remains heavier than water, notably useful for its antiseptic and preservative properties. It is produced in some quantities from the burning of wood and coal in blast furnaces and fireplaces. Creosote is commonly found inside chimney flues when the wood or coal burns incompletely, producing soot and tarry smoke.

Creosote is well-known in the art of wood preservation. As such, those of ordinary skill in the art will appreciate that creosote, per se, has no defined composition; it is typically a mixture including, amongst other components, monophenols and polyphenols, cresols, guiacol, xylenols and their respective homologues.

Safe Work Australia (see, http://www.safeworkaustralia-.gov.au/sites/SWA/about/Publications/Documents/796/CREOSOTE.docx) provides the following definition of creosote: "Creosote is the name used for a variety of products that are mixtures of many chemicals. Creosotes are created by high-temperature treatment of beech and other woods (beechwood creosote) or coal (coal tar creosote). Creosote prepared from coal tar is the most common form of creosote in the workplace. Creosote is a mixture of several hundred chemicals but only a limited number are present in amounts of more than one percent. There are six major classes of compounds in creosote: aromatic hydrocarbons, including polycyclic aromatic hydrocarbons (PAHs) and alkylated PAHs (which can constitute up to 90 percent of creosote); tar acids/phenolics; tar bases/nitrogen-containing heterocycles; aromatic amines; sulfur-containing heterocycles; and oxygen-containing heterocycles, including dibenzofurans. Generally, phenolic compounds, low-molecular-weight PAHs, and some heterocycles tend to be predominantly in the gaseous phase. Creosote constituents may also occur in the atmosphere as particulate matter. Coal tars are by-products of the high temperature treatment of coal to produce coke or natural gas. Coal tar creosote is a distillation product of coal tar and is a thick, oily liquid that is typically amber to black in colour. Coal tar pitch is a residue produced during the distillation of coal tar and is usually thick, black or dark brown liquid or semisolid with a smoky or aromatic odour. Coal tar pitch volatiles are compounds given off from coal tar pitch when it is heated. Coal tar creosote, coal tar and coal tar pitch are mixtures of similar compounds and are rarely formed in nature".

Further, an EPA preliminary draft dated February 2006 described creosote in the following manner: "Creosote is an oil-based wood preservative that is used for preserving wood, primarily via pressure treatment methods. Creosote treated timber is intended for external/outdoor use in various construction and agricultural applications and has been used extensively in South Australia as a vine post. Creosote serves as a fungicide, insecticide, miticide, and sporicide. Coal tar creosote is obtained from the carbonisation of bituminous coal and is a heterogeneous mixture of about 200-250 aromatic/phenolic chemicals. Eight classes of compounds have been identified as common in creosote: 1. non-substituted six-membered rings; 2. heterocyclic nitrogen bases; 3. heterocyclic oxygen and sulfur compounds; 4. alkyl substituted compounds (including polycyclic rings); 5. hydroxy compounds; 6. aromatic amines; 7. paraffins; 8. naphthenes. The creosote mixture consists of about 85% polyaromatic hydrocarbons (PAHs), 10% phenolic compounds, and 5% nitrogen, sulfur, and oxygen heterocyclic molecules. This suit of chemicals contains both carcinogens and mutagens. Creosote is recognised as a toxic substance, a poison and a skin sensitiser. Existing studies indicate no evidence of neurotoxicity, however concerns exist regarding the toxicological effects of cardiomyopathy resulting from inhalation exposure, dermal inflammation after repeated dermal exposure, and potential developmental toxicant behaviour. Pyrolysis and lower temperature combustion generates a high concentration of toxic gases".

Finally, another, less formal and less technical definition of creosote is "The black goo on telegraph poles". Notwithstanding, despite the lack of a defined composition or technical definition, for the purposes of the present invention, the scope of the term "creosote" would be easily understood by the skilled addressee.

Coal-tar creosote has been historically widely used as a wood preservative agent; both industrially, processed into wood using pressure methods such as "full-cell" or "empty-cell" processes, and more commonly applied to wood through brushing. In addition to toxicity to fungi, insects, and marine borers, it serves as a natural water repellent. It is commonly used to preserve and waterproof cross ties, pilings, telephone poles, power line poles, marine pilings, and fence posts. Although suitable for use in preserving the structural timbers of buildings, it is not generally used that way because it is difficult to apply.

Figure 1:
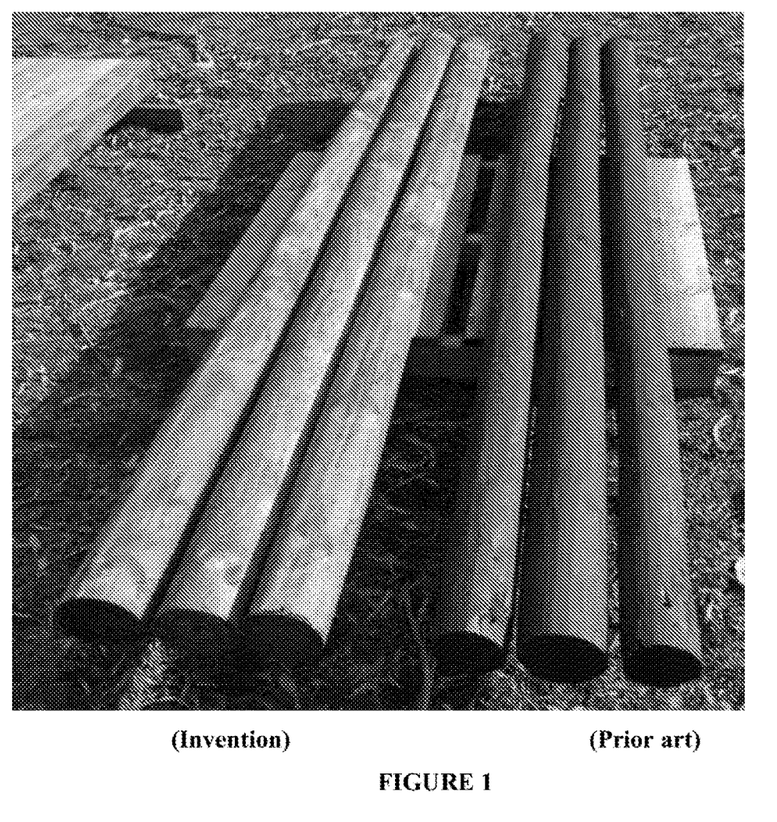
FIG. 1 is a comparative photograph taken of *Radiata* pine posts (left hand side) treated at ambient temperature with water-based creosote according to the present invention to nominal H5 retention, compared with commercially sourced H4 HTC-treated posts (right hand side). The photograph was taken one week after treatment and environmental exposure.

As mentioned, the classical use of creosote as a timber preservative agent has been in respect of telegraph poles. The creosote is generally applied to the pole in a high-temperature ("HTC") process, which gives rise to undesirable outcomes by way of appearance, odour and handling of the treated timber—as well as technicians having to endure the relatively harsh conditions under which the treatment is effected. As shown in FIG. 1 of the accompanying drawings (the three poles on the right hand side of the photograph), HTC treated timber is generally black in appearance and is prone to exudation of dark, viscous liquids that make the handling of the timber difficult and hazardous. As mentioned, the high temperature method results in vapour emissions at the treatment plant, providing a somewhat hazardous work environment.

Accordingly, the use of creosote as a timber preservative has historically given rise to a juxtaposition of properties in the treated timber. On the one hand, toxicity, the high temperature process, vapour emissions, leaching, active bleeding, etc., have naturally suggested that alternative preservatives should be sought, where possible. However, on the other hand, the outstanding preservative qualities of creosote—particularly when the treated wood is subjected to H4/H5 environmental conditions, still keeps creosote at the forefront of a skilled technician's thinking when charged with treating telegraph poles, railway sleepers and the like.

It is an object of the present invention to overcome or ameliorate at least one of the disadvantages of the prior art, or to provide a useful alternative.

It is an object of a form of the present invention to provide for a wood treatment formulation comprising creosote that meets the industry-specific standards of active ingredient retention and penetration associated with Hazard Classes H4 and H5 as defined under AS 1604-2012. The treated wood should ideally exhibit reduced toxicity, leaching and vapour discharge characteristics, thereby making the inventive preservative formulation—and the method of applying it, relatively attractive to the skilled technician charged with treating telegraph poles and the like to Australian H4/H5 environmental conditions (and comparable conditions/Standards in foreign climates).

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

For the avoidance of doubt, the term "substantially ambient temperature" refers to the temperature of the preservative formulation comprising creosote, not the atmosphere. Hot creosote, applied to a timber substrate (as per the prior art HTC techniques) necessarily falls outside the scope of this definition.

As used herein, "macroemulsion" means a mixture of at least two immiscible liquids where at least one of the liquids has droplets with a diameter greater than about 0.1 micrometer (μm). In some aspects, macroemulsions can scatter light effectively. Macroemulsions, as used herein, are thermodynamically unstable, but can be stabilized for a period of time. Surfactants can be used to reduce the interfacial tension between the liquids, and induce macroemulsion stability for a useful amount of time.

As used herein "microemulsion" means thermodynamically stable, isotropic liquid mixtures of oil, water, and a surfactant. Microemulsions can form upon simple mixing of the components and do not require the high shear conditions generally used in the formation of other emulsions.

Although the invention will be described with reference to specific examples it will be appreciated by those skilled in the art that the invention may be embodied in many other forms.

SUMMARY OF THE INVENTION

According to a first aspect of the present invention there is provided a method of treating timber, the method comprising the steps of: selecting a timber substrate; and applying to the substrate an effective amount of a preservative formulation comprising an oil-in-water macroemulsion or microemulsion of creosote in water; and one or more surfactants, wherein the preservative formulation is at substantially ambient temperature.

In an embodiment, the substantially ambient temperature is between about 5° C. and about 60° C. In some aspects, the substantially ambient temperature is between about 10° C. to about 50° C.; about 12.5° C. to about 40° C.; about 15° C. to about 30° C.; or about 17.5° C. to about 25° C. In some aspects, the substantially ambient temperature is about 20° C.

In an embodiment, the step of applying the preservative formulation, which is at substantially ambient temperature, is performed by means of dipping, brushing, spraying, misting, deluging or otherwise coating the surface area of the timber with the preservative formulation.

In an embodiment, the timber comprises hardwood and/or softwood species. The timber can comprise poles, railway sleepers, marine timber (fresh and saltwater environments), bridging, landscaping, buttressing timbers, and the like. In an embodiment, the timber is pine posts and wherein the preservation is effected to nominal H5 (AS 1604.1-2012) standards.

In an embodiment, the treated timber is lighter in colour, less prone to exudation of dark, viscous liquids, and/or less odoriferous by comparison with the product of the hot creosote treatments characterising the prior art.

In an embodiment, the method comprises at least one vacuum step. The at least one vacuum step may be carried out between about 0 kPa and about −95 kPa.

In an embodiment, the method comprises at least one pressure step. The at least one pressure step may be carried out between about 0 kPa and about +1450 kPa.

In an embodiment, each vacuum and/or pressure step is held for between about 0 and 60 minutes.

According to a second aspect of the present invention there is provided treated timber, when so-treated by a method as defined according to the first aspect of the present invention.

According to a third aspect of the present invention there is provided a preservative concentrate for the treatment of timber at substantially ambient temperature, the concentrate comprising: creosote; and one or more surfactants such that when the concentrate is diluted with a predetermined quantity of water, the creosote is present as an oil-in-water macroemulsion or microemulsion.

In an embodiment, the concentrate further comprises an anti-foaming agent and/or a fire retardant.

In an embodiment, the one or more surfactants comprise non-ionic and/or anionic surfactants. In the case of the surfactant being non-ionic, it can be ethoxylated castor oil, having between about 30 and 60 mol EO (ethylene oxide). For example ethoxylated castor oil, having about 30 mol EO can be used. For example ethoxylated castor oil, having about 36 mol EO can be used. For example ethoxylated castor oil, having about 37 mol EO can be used. For example ethoxylated castor oil, having about 40 mol EO can be used. For example ethoxylated castor oil, having about 42 mol EO can be used. For example ethoxylated castor oil, having about 50 mol EO can be used. For example ethoxylated castor oil, having about 54 mol EO can be used. For example ethoxylated castor oil, having about 60 mol EO can be used.

In an embodiment, the non-ionic surfactant is present in the concentrate in an amount of up to about 20% w/w.

In embodiments where the surfactant is anionic, it can be calcium dodecylbenzene sulfonate (calcium alkylbenzene sulfonate). In some aspects, the calcium dodecylbenzene sulfonate is present in the concentrate in an amount of up to about 10% w/w.

In an embodiment, the one or more surfactants are calcium dodecylbenzene sulfonate in an amount of up to about 20% w/w and calcium dodecylbenzene sulfonate in an amount of up to about 10% w/w.

In an embodiment, the creosote is present in an amount of between about 70 and about 95% w/w of the concentrate.

In an embodiment, the one or more surfactants comprise cationic surfactants. In some embodiments the one or more surfactants can comprise combinations of non-ionic and cationic surfactants. In some aspects, non-ionic surfactants may be combined with cationic surfactants as a mixed emulsifier. In some aspects, cationic surfactants can be selected from the group consisting of cocoamido propylbetaine, benzalkonium chloride, cetrimonium chloride, and N,N-Didecyl-N,N-dimethylammonium chloride.

In an embodiment, the concentrate further comprises one or more co-preservatives in the form of organic or inorganic compounds such as SDI-1 mimetics, fungicides, mouldicides, termiticides, insecticides and bacteriocides.

In an embodiment, the concentrate further comprises one or more co-preservatives in the form of complex II succinate-dehydrogenase compounds also known as SDI or SDHI fungicides, e.g., Benodanil, Flutolanil, Mepronil, Fluopyram, Fenfuram, Carboxin, Oxycarboxin, Thifluzamide, Bixafen, Fluxapyroxad, Furametpyr, Isopyrazam, Penflufen, Penthiopyrad, Sedaxene and Boscalid.

In an embodiment, the substantially ambient temperature is between about 5° C. and about 60° C. In some aspects, the substantially ambient temperature is between about 10° C. to about 50° C.; about 12.5° C. to about 40° C.; about 15° C. to about 30° C.; or about 17.5° C. to about 25° C. In some aspects, the substantially ambient temperature is about 20° C.

According to a fourth aspect of the present invention there is provided a timber preservative formulation, the formulation comprising: a predetermined amount of a timber preservative concentrate as defined according to any one of the preceding claims; and a predetermined amount of water; wherein upon mixing, the creosote is present as an oil-in-water macroemulsion or microemulsion and provides for the treatment of timber at substantially ambient temperature.

In an embodiment, the predetermined amount of water is up to about 90% w/w with respect to the creosote.

In an embodiment, the amount of creosote in the formulation is up to about 40% w/w. In another embodiment, the amount of creosote in the formulation is between about 15% w/w and about 25% w/w.

In an embodiment, the predetermined amount of water is at substantially ambient temperature.

In another embodiment, the predetermined amount of timber preservative concentrate is at substantially ambient temperature.

In an embodiment, the substantially ambient temperature is between about 5° C. and about 60° C. In some aspects, substantially ambient temperature is between about 10° C. to about 50° C.; about 12.5° C. to about 40° C.; about 15° C. to about 30° C.; or about 17.5° C. to about 25° C. In some aspects, the substantially ambient temperature is about 20° C.

According to a fifth aspect of the present invention there is provided a method of making a timber preservative formulation for the treatment of timber at substantially ambient temperature, the method comprising the steps of: mixing a predetermined amount of a timber preservative concentrate as defined according to the first aspect of the present invention with a predetermined amount of water; wherein upon mixing, the creosote is present as an oil-in-water macroemulsion or microemulsion.

In an embodiment, the method comprises the further step of allowing the oil-in-water macroemulsion or microemulsion of creosote to equilibrate to substantially ambient temperature prior to application to the timber.

In an embodiment, the substantially ambient temperature is between about 5° C. and about 60° C. In some aspects, the substantially ambient temperature is between about 10° C. to about 50° C.; about 12.5° C. to about 40° C.; about 15° C. to about 30° C.; or about 17.5° C. to about 25° C. In some aspects, the substantially ambient temperature is about 20° C.

In an embodiment, the predetermined amount of water is up to about 90% w/w with respect to the creosote.

In an embodiment, the amount of creosote in the formulation is up to about 40% w/w. In another embodiment, the amount of creosote in the formulation is between about 15% w/w and about 25% w/w.

According to a sixth aspect of the present invention there is provided a kit for on-the-shelf sale, the kit comprising: a timber preservative concentrate as defined according to the third aspect of the present invention; and instructions that, when followed, facilitate the making of a timber preservative formulation as defined according to the fourth aspect of the present invention.

In an embodiment, the kit comprises further instructions, that when followed, facilitate the treatment of timber at substantially ambient temperature.

In an embodiment, the substantially ambient temperature is between about 5° C. and about 60° C. In some aspects, the substantially ambient temperature is between about 10° C. to about 50° C.; about 12.5° C. to about 40° C.; about 15° C. to about 30° C.; or about 17.5° C. to about 25° C. In some aspects, the substantially ambient temperature is about 20° C.

According to a seventh aspect of the present invention there is provided a method of preserving timber, the method comprising the step of applying to a timber substrate a timber preservative formulation as defined according to the fourth aspect of the present invention, the application step taking place at substantially ambient temperature.

In an embodiment, the substantially ambient temperature is between about 5° C. and about 60° C. In some aspects, the substantially ambient temperature is between about 10° C. to about 50° C.; about 12.5° C. to about 40° C.; about 15° C. to about 30° C.; or about 17.5° C. to about 25° C. In some aspects, the substantially ambient temperature is about 20° C.

In an embodiment, the step of applying the timber preservative formulation at substantially ambient temperature is performed by means of dipping, brushing, spraying, misting, deluging or otherwise coating the surface area of the timber with the preservative formulation.

The inventive method is applicable to both hardwood and softwood species. In an embodiment, the wood species include poles, railway sleepers, marine timber (fresh and saltwater environments), bridging, landscaping, buttressing timbers, and the like.

In some aspects, the timber is pine posts and wherein the preservation is effected to nominal H5 (AS 1604.1-2012) standards. Alternatively, the timber can be hardwoods such as Australian Eucalypts.

In an embodiment, the treated timber is lighter in colour, less prone to exudation of dark, viscous liquids, and/or less odoriferous by comparison with the product of the hot creosote treatments characterising the prior art.

According to an eighth aspect of the present invention there is provided preserved timber, when so-preserved by a method as defined according to the seventh aspect of the present invention.

According to a ninth aspect of the present invention there is provided use of an oil-in-water macroemulsion or microemulsion of creosote, at substantially ambient temperature, to preserve timber.

In an embodiment, the substantially ambient temperature is between about 5° C. and about 60° C. In some aspects, the substantially ambient temperature is between about 10° C. to about 50° C.; about 12.5° C. to about 40° C.; about 15° C. to about 30° C.; or about 17.5° C. to about 25° C. In some aspects, the substantially ambient temperature is about 20° C.

In an embodiment, the macroemulsion or microemulsion is prepared by addition to the creosote an effective amount of one or more surfactants; a predetermined amount of water and optionally an effective amount of an anti-foaming agent.

According to a tenth aspect of the present invention there is provided in situ timber preserved with creosote, the creosote applied to the timber at substantially ambient temperature by a method as defined according to the seventh aspect of the present invention.

In an embodiment, the substantially ambient temperature is between about 5° C. and about 60° C. In some aspects, the substantially ambient temperature is between about 10° C. to about 50° C.; about 12.5° C. to about 40° C.; about 15° C. to about 30° C.; or about 17.5° C. to about 25° C. In some aspects, the substantially ambient temperature is about 20° C.

According to an eleventh aspect of the present invention there is provided a method of treating or re-treating in situ timber, the method comprising the step of applying to the in situ timber, a timber preservative formulation as defined according to the fourth aspect of the present invention, the application step taking place at substantially ambient temperature.

In an embodiment, the substantially ambient temperature is between about 5° C. and about 60° C. In some aspects, the substantially ambient temperature is between about 10° C. to about 50° C.; about 12.5° C. to about 40° C.; about 15° C. to about 30° C.; or about 17.5° C. to about 25° C. In some aspects, the substantially ambient temperature is about 20° C.

In an embodiment, the step of applying the timber preservative formulation at substantially ambient temperature is performed by means of dipping, brushing, spraying, misting, deluging or otherwise coating the surface area of the timber with the preservative formulation.

In an embodiment, the method is applicable to both hardwood and softwood species. The wood species can include poles, railway sleepers, marine timber (fresh and saltwater environments) bridging, landscaping, buttressing timbers, and the like. In an embodiment, the timber is pine posts and wherein the preservation is effected to nominal H5 (AS 1604.1-2012) standards.

In an embodiment, the in situ treated or re-treated timber is lighter in colour, less prone to exudation of dark, viscous liquids, and/or less odoriferous by comparison with the product of hot creosote treatments characterising the prior art.

According to a twelfth aspect of the present invention there is provided treated or re-treated in situ timber, when so treated or re-treated by a method as defined according to the eleventh aspect of the invention.

Finally, according to a thirteenth aspect of the present invention there is provided creosote, when used to treat timber at substantially ambient temperature, the creosote being an oil-in-water macroemulsion or microemulsion.

In an embodiment, the substantially ambient temperature is between about 5° C. and about 60° C. In some aspects, the substantially ambient temperature is between about 10° C. to about 50° C.; about 12.5° C. to about 40° C.; about 15° C. to about 30° C.; or about 17.5° C. to about 25° C. In some aspects, the substantially ambient temperature is about 20° C.

Accordingly, throughout the ensuing discussion, any reference to the spirit and the scope of the present invention (or similar terms) should be construed to refer to the various adaptations of creosote, as described hereinafter, for the purposes of treating timber with the creosote-containing preservative formulation being at substantially ambient temperature.

For timber treated by the inventive formulation or method, the preservative penetration within the treated wood is by way of substantially complete penetration. In some aspects, the substantially complete penetration can be in accordance with Hazard Class H4 and/or H5 of the Australian Standard AS 1604.1-2012.

The treated wood may be substantially not susceptible to leaching or bleeding of the preservative from the wood.

The inventive method optionally comprises at least one vacuum step, which can be between about 0 kPa and about −95 kPa. The method optionally further comprises at least one pressure step, which can be between about 0 kPa and about +1450 kPa. Each vacuum and/or pressure step may be held for between about 0 and 60 minutes.

In another embodiment a final vacuum step is applied, the final vacuum step taking place when the wood is no longer exposed to the preservative formulation. The final vacuum step can be between about 0 kPa and −95 kPa and can be held from about 0 to 60 minutes.

According to another form of the invention there is provided a method of preparing a formulation for treating wood, the method comprising the step of admixing a preservative concentrate defined above, with a predetermined quantity of water.

As related above, one of the principal advantages provided by the present invention is that the creosote active can be applied at ambient temperature. By "ambient" is meant approximately 5° C. through approximately 60° C. (i.e., dependent upon the season and location the inventive method is performed). For instance, performing the inventive method in Moscow, in the middle of winter obviously defines a different "ambient" than does the Arizona desert at 2 pm on a summer's day. Thus, for the avoidance of doubt, "ambient" temperature is defined as about 5 to about 60° C. In some aspects, "ambient" temperature can be between about 10 to about 50° C.; about 12.5 to about 40° C.; about 15 to about 30° C.; about 17.5 to about 2° C.: or about 20° C. Significantly, the upper limit of 60° C. corresponds very generally to the limpid point of creosote when used in conventional HTC processes. In other words, were one to take a traditional HTC treatment formulation and cool it to about 60° C., various components of the creosote would begin to crystallise out, as described elsewhere. As such, HTC methods are substantially unfeasible at temperatures below 60° C., whereas the inventive method can be effected at temperatures as low as about 5° C.

In providing for an ambient temperature method, it is found that the present invention is especially advantageous. When applied in a traditional HTC method, it is found that crystals form in the creosote when it is not kept hot. This crystal formation, which happens at the limpid point of the precise creosote composition being applied, is a problem when creosote is transported or stored. Whenever a car or tank of creosote cools, crystals form and settle out and it is difficult to get all the settled crystals back into solution by reheating the creosote. Accordingly, traditional HTC creosote generally cannot physically be applied at ambient temperature, due to the viscosity of the liquid and perhaps also its limpid point. If, at ambient temperature, the creosote liquid contains a precipitated component, then the treatment will not be satisfactory, in terms of the preservative penetration as well as the appearance.

The compositions according to the invention may be used to treat substrates such as wood or other cellulosic formulations (such as cotton, hessian, rope and cordage). For convenience, the invention is described with reference to the treatment of wood, but it will be appreciated that the other formulations may be treated analogously. By "wood", the Applicant envisages treating both hardwood and softwood species. Examples include poles, railway sleepers, marine timber (fresh and saltwater environments) bridging, landscaping, buttressing timbers, etc.

The compositions of the invention may contain other organic compounds including fungicides, mouldicides, termiticides, insecticides and bacteriocides. Such organic compounds include carboxylic acids such as naphthenic acids and branched aliphatic acids and their metal salts such as copper and zinc naphthenate, phenols and substituted phenols such as orthophenyl phenol and its alkali metal or ammonia salts; polyhalogenated phenols such as pentachlorophenol or tribromophenol and their alkali metal or ammonia salts; quaternary ammonium salts and tertiary amine salts such as didecyl dimethyl ammonium chloride, octyl decyl dimethyl ammonium chloride, dodecyl dimethyl benzyl ammonium chloride, dodecyl benzyl trimethyl ammonium chloride, dodecyl dimethyl amine acetate, dodecyl dimethyl amine lactate, dodecyl dimethyl amine salicylate, didodecyl methyl amine chloride; isdthiazolone derivatives such as 4,5-dichloro-2-(n-octyl)-4-isothiazolin-3-one or 2-methyl-4-isothiazolin-3-one, 2n-octyl-4-isothiazolin-3-one and mixtures of those and other related compounds; sulfamide derivatives such as N,N-dimethyl-N-phenyl-(N-fluorodichloro-methylthio)-sulfonamide, N,N-dimethyl-N-tolyl-N-(dichlorofluoro-methylthio)-sulfamide; azoles such as imidazole; MBT (methylene-bis thiocyanate); IPBC (3-iodo-2-propanyl-butyl-carbamate); carbendazim and chlorothalonil; N-nitrosophenylhydroxylamine and N-nitroso cyclohexyl hydroxylamine, either as their metal salts or as metal chelates; pyrethroid type insecticides selected from the group consisting of cyano-(4-fluoro-3-phenoxy-phenyl)-methyl-3-(2,2-dichioroethenyl)-2,2-dimethyl cyclopropanecarboxylate, (3-phenoxyphenyl)methyl-3-(2, 2-dichloro-ethyenyl)-2,2-dimethyl-cyclopropanecarboxy-late, cyano-(3-phenoxy-phenyl)-methyl-2-(4-chlorophenyl)-3-methylbutyrate, and mixtures thereof; organo-phosphorous, carbamate, organochlorine insecticides such as lindane and SDI-1 mimetics such as chlorophen and pentaphen.

The concentrate may further comprise one or more co-preservatives in the form of complex II succinate-dehydro-genase compounds also known as SDI or SDHI fungicides, e.g., Benodanil. Flutolanil, Mepronil, Fluopyram, Fenfuram, Carboxin, Oxycarboxin, Thifluzamide, Bixafen, Fluxapy-roxad, Furametpyr, Isopyrazam, Penflufen, Penthiopyrad, Sedaxene and Boscalid.

Other biocidally-active elements may also be present as co-preservatives, such as boron, in any form, for example boric acid, boric acid/borax mixtures, disodium octaborate tetrahydrate, boric acid—amine mixtures (where the amine may for example be monoethanolamine. diethanolmaine or triethanolamnine), borate/glycol mixtures (including mono-ethylene glycol or glycerol) or boron esters and also fluo-rides and silicafluorides. Compositions in accordance with the disclosure can comprise copper(II) ion, a triazole com-pound which is tebuconazole or propiconazole, and option-ally an alkanolamine, as well as optionally borate ion and/or a quaternary ammonium compound or a mixture of quater-nary ammonium compounds.

In an embodiment, the co-preservative is selected from the group consisting of: insecticides, termiticides, fungi-cides, mouldicides, or the like, and mixtures thereof. In some aspects, the preservative is selected from the group consisting of: synthetic pyrethroids (such as allethrin, bifen-thrin, cypermethrin, cyphenothrin, deltamethrin, permethrin, prallethrin, resmethrin, sumithrin, tetramethrin, tralome-thrin, transfluthrin, imiprothrin), azoles, triazoles, copper azole-based compounds, organic biocides, thiachloprid, imi-dachloprid or the like, and mixtures thereof, triazoles, cop-per azole-based compounds, organic biocides, iodopropy-nylbuthylcarbamate (IPBC), organic tin compounds such as tributyltin naphthenate (TBTN), organic copper compounds such as copper 8 quinolinolate, copper naphthenate, organic zinc compounds, quaternary ammonium compounds, ter-tiary ammonium compounds, isothiazolones, boron com-pounds, 3-benzothien-2-yl-5,6-dihydro-1,4,2-oxathiazine-4-oxide (Bethogard®) and bis-(N-cyclohexyldiazenuimdioxy) copper ("Cu-HDO")", and mixtures thereof.

In an embodiment, the co-preservative is a triazole com-pound of formulae (I) or (II), above, wherein $R_1$ represents a branched or straight chain $C_{1-5}$alkyl group; $R_2$ represents a phenyl group optionally substituted by one or more substituents selected from halogen, $C_{1-3}$alkyl, $C_{1-3}$alkoxy, phenyl and nitro; $R_3$ is as defined for $R_2$; and $R_4$ represents a hydrogen atom or a branched or straight chain $C_{1-5}$alkyl. In some aspects, the triazole compound of formula (I) is tebuconazole ((RS)-1-(4-chlorophenyl)-4,4-dimethyl-3-(1H-1,2,4-triazol-1-ylmethyl)pentan-3-ol), or hexaconazole (α-butyl-α-(2,4-dichlorophenyl)-1H-1,2,4-triazole-1-etha-nol). For example, the triazole compound of formula (I) is tebuconazole.

In an embodiment, the triazole compound of formula (II) is propiconazole (1-[[2-(2,4-dichlorophenyl)-4-propyl-1,3-dioxolan-2-yl]methyl]-1H-1,2,4-triazole); azaconazole (1-[[2,4-dichlorophenyl)-1,3-dioxolan-2-yl]methyl]-1H-1,2,4-triazole); or difenaconazole (1-[2-[2-chloro-4-(4-chlorophenoxy)phenyl]-4-methyl-1,3-dioxolan-2-ylmethyl]-1H-1,2,4-triazole).

In an embodiment, the co-preservative is a triazole com-pound selected from the group consisting of: azaconazole, bromuconazole, cyproconazole, diclobutrazol, difenocona-zole, diniconazole, diniconazole-M, epoxiconazole, etaconazole, fenbuconazole, fluquinconazole, flusilazole, flutriafol, furconazole, furconazole-cis, hexaconazole, imi-benconazole, ipconazole, metconazole, myclobutanil, pen-conazole, propiconazole, prothioconazole, quinconazole, simeconazole, tebuconazole, tetraconazole, triadimefon, tri-adimenol, triticonazole, uniconazole, and uniconazole-P.

The skilled person will be well acquainted with the various methods of treating the substrates with aqueous solutions. For example, the compositions according to the invention may be applied to wood by dipping, spraying, deluging, brushing, vacuum impregnation, pressure impreg-nation and/or any other applicable method. Other types of substrate may be treated by analogous methods.

The porous substrate, such as a timber pole, can be processed in any condition. The wood can be a hardwood or a softwood species. The wood can be wet or dry. If the wood is wet, it may optionally be dried to a predetermined water content by any method known to the person skilled in the art. Such methods include kiln or vacuum drying. Drying the wood is not important for the laminating or treating pro-cesses but it is important for the satisfactory coupling of the structural laminate or subsequent cured resin to the wood. Typically, the first step involves providing a timber substrate dried to a desired water content.

BRIEF DESCRIPTION OF THE FIGURES

An embodiment of the invention will now be described with reference to the accompanying Figures, in which:

FIG. 2 relates to sample 11d(i), taken from Example 11, below. Sample 11d(i) consists essentially of 1% w/w DDAC+19% w/w creosote and was photographed 15 min-utes after the addition of water, wherein there was some emulsification which broke quickly and separated with the heavy oily residue not emulsified (FIG. 2a), 1 hour after the addition of water, in which the components had separated almost completely (FIG. 2b), 24 hours after the addition of water at which time only a small portion of material remained emulsified with the rest precipitated and coalesced into a dark oily material (FIG. 2c), 1 minute after re-mixing following 24 hours of standing, at which point the solution does re-emulsify but requires constant agitation (FIG. 2d), and 15 minutes after re-mixing, at which time it looks similar to that observed upon standing for 24 hours (FIG. 2e).

The following non-limiting Examples further illustrate some embodiments of the present invention.

EXAMPLES

A water-based product for ambient temperature creosote treatment has been developed that largely addresses many of the principal issues associated with high temperature creosote (HTC), namely the appearance, odour and handling of the treated timber—and the conditions under which it is applied. Timber treated with the inventive water-based creosote product is light brown in appearance, rather than black (see, FIG. 1). The timber treated with the inventive formulation is less prone to exudation of dark, viscous liquids that make the handling of the pole difficult and hazardous.

One everyday comparative example of some of the advantages of the present invention relates to the use of treated timber bridging over a river. With conventional HTC-treated timber, creosote is prone to leaching out of the treated wood and into the water, thereby contaminating the river. By comparison, it is found that timber treated by the inventive process and employed in an otherwise identical environment gives rise to little or no leaching of the creosote into the water. The environmental benefits are clear in this regard.

The inventive water-based creosote product has the significant advantage that it is applied at ambient temperature (rather than having to be heated as is the case for HTC). This reduces the vapour emissions at the treatment plant, providing a safer, less hazardous work environment, as well as substantially reducing the odour at the treatment plant. To this end, it will be appreciated that governmental regulatory agencies, such as the United States EPA, are becoming ever-more watchful of technologies that either pollute the environment, or endanger technicians working in the vicinity.

The water-based creosote formulation is formed by combining creosote with a mixture of a non-ionic surfactant (e.g., ethoxylated castor oil) and an anionic surfactant (e.g., calcium dodecylbenzene sulfonate). Anti-foamer/s and/or fire retardant/s are optional ingredients.

Any suitable anti-foam or fire retardants can be used. For example, in some embodiments, commercially available anti-foam marketed as Dow Corning 1410 is used.

Exemplary concentrates have the compositions outlined below. These exemplary concentrates are effective for treating timber at ambient conditions as is described herein. The exemplary concentrates can be diluted with water to the appropriate solution strength and used to treat both hardwoods and softwoods. The ratio of creosote to emulsifier can vary, whilst still adequately performing the treatment function. Similarly, where two or more emulsifiers are applied, the ratio of the two emulsifiers can vary; the product still performs satisfactorily.

The timber treated with the disclosed formulation has been shown to be as efficacious, in respect of its preservative qualities, as that treated with standard HTC creosote processes. Moreover, handling, storage and in situ construction using the disclosed formulation is significantly enhanced by comparison with traditional HTC-based creosote formulations.

Example 1

An exemplary concentrate: creosote about 92% w/w; and no water.

| Ingredient | Conc. % w/w |
| --- | --- |
| Creosote (conforming with AS 1604.1-2012) | 91.99 |
| Castor oil, ethoxylated (ECO) | 3.88 |
| Calcium dodecylbenzene sulfonate, mixed with co-solvents (e.g., 2-ethylhexanol, propylene glycol) | 3.88 |
| Anti-foam | 0.25 |
| Water | 0.00 |
| | 100 |

A range of formulations were considered, including: various ratios of emulsifier to creosote; for a given total emulsifier concentration, different ratios of non-ionic and anionic components; concentrates and work solutions examined; emulsion properties compared with those for Lonza MK265-type system, which utilises LET75 as the emulsifier.

| Ingredient | Conc. % w/w |
| --- | --- |
| Creosote (conforming with AS 1604.1-2012) | 91.99 |
| Castor oil, ethoxylated (ECO) | 3.37 |
| Calcium dodecylbenzene sulfonate, mixed with co-solvents (e.g., 2-ethylhexanol, propylene glycol) | 4.50 |
| Anti-foam | 0.25 |
| Water | 0.00 |
| | 100 |

| Ingredient | Conc. % w/w |
| --- | --- |
| Creosote (conforming with AS 1604.1-2012) | 91.99 |
| Castor oil, ethoxylated (ECO) | 2.88 |
| Calcium dodecylbenzene sulfonate, mixed with co-solvents (e.g., 2-ethylhexanol, propylene glycol) | 4.88 |
| Anti-foam | 0.25 |
| Water | 0.00 |
| | 100 |

| Ingredient | Conc. % w/w |
| --- | --- |
| Creosote (conforming with AS 1604.1-2012) | 91.99 |
| Castor oil, ethoxylated (ECO) | 4.88 |
| Calcium dodecylbenzene sulfonate, mixed with co-solvents (e.g., 2-ethylhexanol, propylene glycol) | 2.88 |
| Anti-foam | 0.25 |
| Water | 0.00 |
| | 100 |

Example 2

A concentrate that can be diluted with water; a relatively high ECO:ABS ratio:

| Ingredient | Conc. % w/w |
| --- | --- |
| Creosote (conforming with AS 1604.1-2012) | 70.00 |
| Castor oil, ethoxylated (ECO) | 17.50 |
| Alkybenzene sulfonic acid (ABS) | 2.50 |
| Anti-foam | 0.25 |
| Water | 9.75 |
| | 100 |

Example 3

A concentrate that can be diluted with water; a relatively high ECO:ABS ratio:

| Ingredient | Conc. % w/w |
| --- | --- |
| Creosote (conforming with AS 1604.1-2012) | 70.00 |
| Castor oil, ethoxylated (ECO) | 2.50 |
| Alkybenzene sulfonic acid (ABS) | 2.50 |
| Anti-foam | 0.25 |
| Water | 24.75 |
| | 100 |

Example 4

A concentrate that can be diluted with water; a relatively high ECO:ABS ratio:

| Ingredient | Conc. % w/w |
| --- | --- |
| Creosote (conforming with AS 1604.1-2012) | 70.00 |
| Castor oil, ethoxylated (ECO) | 2.57 |
| Alkybenzene sulfonic acid (ABS) | 3.43 |
| Anti-foam | 0.25 |
| Water | 23.75 |
| | 100 |

Example 5

A concentrate, free of water, which can be diluted with water for the treatment of timber. This example has a relatively high creosote to total emulsifier ratio, hence is relatively cost effective:

| Ingredient | Conc. % w/w |
| --- | --- |
| Creosote (conforming with AS 1604.1-2012) | 91.99 |
| Castor oil, ethoxylated (ECO) | 3.37 |
| Alkybenzene sulfonic acid (ABS) | 4.50 |
| Anti-foam | 0.25 |
| Water | 0.00 |
| | 100 |

Example 6

A concentrate, free of water, which can be diluted with water for the treatment of timber. This example has a relatively high creosote to total emulsifier ratio, hence is relatively cost effective:

| Ingredient | Conc. % w/w |
| --- | --- |
| Creosote (conforming with AS 1604.1-2012) | 92.11 |
| Castor oil, ethoxylated (ECO) | 3.38 |
| Alkybenzene sulfonic acid (ABS) | 4.51 |
| Anti-foam | 0.00 |
| Water | 0.00 |
| | 100 |

The ethoxylated castor oil (ECO) can contain a range of EO units, typically between about 30 and 60 mol EO. For example, emulsification can be achieved with ECO which contains 36 mole EO. The skilled person will appreciate that other surfactants may be just as efficacious.

A range of additives can be included in the formulations: for instance, copper amine preservatives, e.g., copper azole, SDI-1 mimetic compounds, boron containing additives including disodium octaborate, boric acid and borate-ethanolamine solutions, and wax emulsions, e.g., paraffin wax emulsion.

Example 7

A concentrate, further comprising one or more co-preservatives in the form of complex II succinate-dehydrogenase compounds also known as SDI or SDHI fungicides present in a range of weight percents. SDI or SDHI fungicides comprise compounds such as Benodanil, Flutolanil, Mepronil, Fluopyram, Fenfuram, Carboxin, Oxycarboxin, Thifluzamide, Bixafen, Fluxapyroxad, Furametpyr, Isopyrazam, Penflufen, Penthiopyrad, Sedaxene and Boscalid:

| Ingredient | Conc. % w/w |
| --- | --- |
| Creosote (conforming with AS 1604.1-2012) | 93.00 |
| Penflufen | 1.00 |
| Castor oil, ethoxylated (ECO) | 3.00 |
| Alkybenzene sulfonic acid (ABS) | 3.00 |
| Anti-foam | 0.00 |
| Water | 0.00 |
| | 100 |

Example 8

A concentrate as described above in respect of Example 2, was diluted 1:1 with tap water at ambient temperature; and mixed thoroughly. The formation of an oil-in-water emulsion was observed. The resultant diluted formulation was then used to treat a *Radiata* pine pole by vacuum-pressure treatment. The treated pole was left to dry at ambient temperature for three days, at which time it was compared visually with an equivalent pole treated via a prior art HTC process. The pole treated according to this example exhibited a lighter coloration, fewer noticeable odoriferous emissions, and was less greasy to the touch.

Example 9

A concentrate as described above in respect of Example 1, was diluted 2:1 with tap water at ambient temperature; and mixed thoroughly. The formation of an oil-in-water emulsion was observed. The resultant diluted formulation was then coated upon a hardwood sleeper employed along a train line, by brushing, in situ. The product was simple and convenient to use for remedial treatment of timbers already in service.

Example 10

Examples of working solutions of creosote/non-ionic surfactant are provided below. However, the invention may also be embodied in a concentrate that is free of water. In the examples provided below, Creosote was premixed with surfactant/solvent at a ratio of surfactant/creosote not exceeding 1 to 19. The product was combined with water at a ratio of 1 part product to 4 parts water and agitated under low to medium shear.

Formulations may optionally contain anti-foam; a typical amount is ~0.25% w/w.

A typical emulsifier active concentration in the product is provided, but it would be appreciated by one of skill in the art that this may vary from product-to-product. The overall emulsifier concentration in the examples can be calculated from the emulsifier 'active' concentration in the product, and the concentration of the product in the creosote work solution.

The creosote concentration in the work solution can vary, e.g., depending upon the intended Hazard Class, the species being treated and the process used.

The surfactant concentration can vary, but is practically <5% w/w.

Examples 10a to 10k demonstrate the use of non-ionic surfactants

| | Example | | | | | |
|---|---|---|---|---|---|---|
| Ingredient | 10a(i) % w/w | 10a(ii) % w/w | 10a(iii) % w/w | 10a(iv) % w/w | 10a(v) % w/w | 10a(vi) % w/w |
| Creosote (conforming with AS1604 - 2012) | 19 | 19 | 19 | 19 | 19 | 19 |
| Nonyl phenol ethoxylate (15 mol EO), ~95% active emulsifier | 1 | 2 | 3 | 4 | 5 | 10 |
| Water | 80 | 79 | 78 | 77 | 76 | 71 |
| Total | 100 | 100 | 100 | 100 | 100 | 100 |

| | Example | | | | | |
|---|---|---|---|---|---|---|
| Ingredient | 10b(i) % w/w | 10b(ii) % w/w | 10b(iii) % w/w | 10b(iv) % w/w | 10b(v) % w/w | 10b(vi) % w/w |
| Creosote (conforming with AS1604 - 2012) | 19 | 19 | 19 | 19 | 19 | 19 |
| C9-C11 alcohol ethoxylate (8 mol EO), ~95% active emulsifier | 1 | 2 | 3 | 4 | 5 | 10 |
| Water | 80 | 79 | 78 | 77 | 76 | 71 |
| Total | 100 | 100 | 100 | 100 | 100 | 100 |

| | Example | | | | | |
|---|---|---|---|---|---|---|
| Ingredient | 10c(i) % w/w | 10c(ii) % w/w | 10c(iii) % w/w | 10c(iv) % w/w | 10c(v) % w/w | 10c(vi) % w/w |
| Creosote (conforming with AS1604 - 2012) | 19 | 19 | 19 | 19 | 19 | 19 |
| C10-C12 alcohol ethoxylate (12 mol EO), ~95% active emulsifier | 1 | 2 | 3 | 4 | 5 | 10 |
| Water | 80 | 79 | 78 | 77 | 76 | 71 |
| Total | 100 | 100 | 100 | 100 | 100 | 100 |

| | Example | | | | | |
|---|---|---|---|---|---|---|
| Ingredient | 10d(i) % w/w | 10d(ii) % w/w | 10d(iii) % w/w | 10d(iv) % w/w | 10d(v) % w/w | 10d(vi) % w/w |
| Creosote (conforming with AS1604 - 2012) | 19 | 19 | 19 | 19 | 19 | 19 |
| Alkyl polyglucoside based on a fatty acid, e.g., lauric acid. ~50% active emulsifier | 1 | 2 | 3 | 4 | 5 | 10 |
| Water | 80 | 79 | 78 | 77 | 76 | 71 |
| Total | 100 | 100 | 100 | 100 | 100 | 100 |

| | Example | | | | | |
|---|---|---|---|---|---|---|
| Ingredient | 10e(i) % w/w | 10e(ii) % w/w | 10e(iii) % w/w | 10e(iv) % w/w | 10e(v) % w/w | 10e(vi) % w/w |
| Creosote (conforming with AS1604 - 2012) | 19 | 19 | 19 | 19 | 19 | 19 |
| Alkyl polyglucoside based on a fatty acid, e.g., lauric acid. ~50% active emulsifier | 1 | 2 | 3 | 4 | 5 | 10 |
| Water | 80 | 79 | 78 | 77 | 76 | 71 |
| Total | 100 | 100 | 100 | 100 | 100 | 100 |

| | Example | | | | | |
|---|---|---|---|---|---|---|
| Ingredient | 10f(i) % w/w | 10f(ii) % w/w | 10f(iii) % w/w | 10f(iv) % w/w | 10f(v) % w/w | 10f(vi) % w/w |
| Creosote (conforming with AS1604 - 2012) | 19 | 19 | 19 | 19 | 19 | 19 |

-continued

| Ingredient | 10f(i) % w/w | 10f(ii) % w/w | 10f(iii) % w/w | 10f(iv) % w/w | 10f(v) % w/w | 10f(vi) % w/w |
|---|---|---|---|---|---|---|
| Secondary alcohol ethoxylate, e.g., softenol 90. ~95% active emulsifier | 1 | 2 | 3 | 4 | 5 | 10 |
| Water | 80 | 79 | 78 | 77 | 76 | 71 |
| Total | 100 | 100 | 100 | 100 | 100 | 100 |

| Ingredient | 10g(i) % w/w | 10g(ii) % w/w | 10g(iii) % w/w | 10g(iv) % w/w | 10g(v) % w/w | 10g(vi) % w/w |
|---|---|---|---|---|---|---|
| Creosote (conforming with AS1604 - 2012) | 19 | 19 | 19 | 19 | 19 | 19 |
| Ethoxylated sorbitan oleate, e.g., Tween 80. ~95% active emulsifier | 1 | 2 | 3 | 4 | 5 | 10 |
| Water | 80 | 79 | 78 | 77 | 76 | 71 |
| Total | 100 | 100 | 100 | 100 | 100 | 100 |

| Ingredient | 10h(i) % w/w | 10h(ii) % w/w | 10h(iii) % w/w | 10h(iv) % w/w | 10h(v) % w/w | 10h(vi) % w/w |
|---|---|---|---|---|---|---|
| Creosote (conforming with AS1604 - 2012) | 19 | 19 | 19 | 19 | 19 | 19 |
| Ethoxylated castor oil, e.g., ~36 mol EO | 1 | 2 | 3 | 4 | 5 | 10 |
| Water | 80 | 79 | 78 | 77 | 76 | 71 |
| Total | 100 | 100 | 100 | 100 | 100 | 100 |

| Ingredient | 10i(i) % w/w | 10i(ii) % w/w | 10i(iii) % w/w | 10i(iv) % w/w | 10i(v) % w/w | 10i(vi) % w/w |
|---|---|---|---|---|---|---|
| Creosote (conforming with AS1604 - 2012) | 19 | 19 | 19 | 19 | 19 | 19 |
| Ethoxylated castor oil, e.g., ~40 mol EO | 1 | 2 | 3 | 4 | 5 | 10 |
| Water | 80 | 79 | 78 | 77 | 76 | 71 |
| Total | 100 | 100 | 100 | 100 | 100 | 100 |

| Ingredient | 10j(i) % w/w | 10j(ii) % w/w | 10j(iii) % w/w | 10j(iv) % w/w | 10j(v) % w/w | 10j(vi) % w/w |
|---|---|---|---|---|---|---|
| Creosote (conforming with AS1604 - 2012) | 19 | 19 | 19 | 19 | 19 | 19 |
| Ethoxylated castor oil, e.g., ~54 mol EO | 1 | 2 | 3 | 4 | 5 | 10 |
| Water | 80 | 79 | 78 | 77 | 76 | 71 |
| Total | 100 | 100 | 100 | 100 | 100 | 100 |

| Ingredient | 10k(i) % w/w | 10k(ii) % w/w | 10k(iii) % w/w | 10k(iv) % w/w | 10k(v) % w/w | 10k(vi) % w/w |
|---|---|---|---|---|---|---|
| Creosote (conforming with AS1604 - 2012) | 19 | 19 | 19 | 19 | 19 | 19 |
| Coco-alkyldimethyl amine-N-oxide | 1 | 2 | 3 | 4 | 5 | 10 |
| Water | 80 | 79 | 78 | 77 | 76 | 71 |
| Total | 100 | 100 | 100 | 100 | 100 | 100 |

| Ingredient | 10l(i) % w/w | 10l(ii) % w/w | 10l(iii) % w/w | 10l(iv) % w/w | 10l(v) % w/w | 10l(vi) % w/w |
|---|---|---|---|---|---|---|
| Creosote (conforming with AS1604 - 2012) | 19 | 19 | 19 | 19 | 19 | 19 |
| cocoamido propylbetaine | 1 | 2 | 3 | 4 | 5 | 10 |
| Water | 80 | 79 | 78 | 77 | 76 | 71 |
| Total | 100 | 100 | 100 | 100 | 100 | 100 |

| Ingredient | 10m(i) % w/w | 10m(ii) % w/w | 10m(iii) % w/w | 10m(iv) % w/w | 10m(v) % w/w | 10m(vi) % w/w |
|---|---|---|---|---|---|---|
| Creosote (conforming with AS1604 - 2012) | 19 | 19 | 19 | 19 | 19 | 19 |
| benzalkonium chloride | 1 | 2 | 3 | 4 | 5 | 10 |
| Water | 80 | 79 | 78 | 77 | 76 | 71 |
| Total | 100 | 100 | 100 | 100 | 100 | 100 |

| Ingredient | Example 10n(i) % w/w | 10n(ii) % w/w | 10n(iii) % w/w | 10n(iv) % w/w | 10n(v) % w/w | 10n(vi) % w/w |
|---|---|---|---|---|---|---|
| Creosote (conforming with AS1604-2012) | 19 | 19 | 19 | 19 | 19 | 19 |
| Cetrimonium chloride | 1 | 2 | 3 | 4 | 5 | 10 |
| Water | 80 | 79 | 78 | 77 | 76 | 71 |
| Total | 100 | 100 | 100 | 100 | 100 | 100 |

| Ingredient | Example 10o(i) % w/w | 10o(ii) % w/w | 10o(iii) % w/w | 10o(iv) % w/w | 10o(v) % w/w | 10o(vi) % w/w |
|---|---|---|---|---|---|---|
| Creosote (conforming with AS1604-2012) | 19 | 19 | 19 | 19 | 19 | 19 |
| N,N-Didecyl N,N-dimethyl-ammonium chloride | 1 | 2 | 3 | 4 | 5 | 10 |
| Water | 80 | 79 | 78 | 77 | 76 | 71 |
| Total | 100 | 100 | 100 | 100 | 100 | 100 |

| Ingredient | Example 10p(i) % w/w | 10p(ii) % w/w | 10p(iii) % w/w | 10p(iv) % w/w | 10p(v) % w/w | 10p(vi) % w/w |
|---|---|---|---|---|---|---|
| Creosote (AS1604-2012) | 19 | 19 | 19 | 19 | 19 | 19 |
| Morpholine oleate | 0.5 | 1 | 1.5 | 2 | 2.5 | 5 |
| ethoxylated sorbitan oleate | 0.5 | 1 | 1.5 | 2 | 2.5 | 5 |
| Water | 80 | 79 | 78 | 77 | 76 | 71 |
| Total | 100 | 100 | 100 | 100 | 100 | 100 |

| Ingredient | Example 10q(i) % w/w | 10q(ii) % w/w | 10q(iii) % w/w | 10q(iv) % w/w | 10q(v) % w/w | 10q(vi) % w/w |
|---|---|---|---|---|---|---|
| Creosote (AS1604-2012) | 19 | 19 | 19 | 19 | 19 | 19 |
| Morpholine oleate | 0.5 | 1 | 1.5 | 2 | 2.5 | 5 |
| alkyl polyglucocide based on lauric acid | 0.5 | 1 | 1.5 | 2 | 2.5 | 5 |
| Water | 80 | 79 | 78 | 77 | 76 | 71 |
| Total | 100 | 100 | 100 | 100 | 100 | 100 |

| Ingredient | Example 10r(i) % w/w | 10r(ii) % w/w | 10r(iii) % w/w | 10r(iv) % w/w | 10r(v) % w/w | 10r(vi) % w/w |
|---|---|---|---|---|---|---|
| Creosote (AS1604-2012) | 19 | 19 | 19 | 19 | 19 | 19 |
| Morpholine oleate | 0.5 | 1 | 1.5 | 2 | 2.5 | 5 |
| Castor oil ethoxylate | 0.5 | 1 | 1.5 | 2 | 2.5 | 5 |
| Water | 80 | 79 | 78 | 77 | 76 | 71 |
| Total | 100 | 100 | 100 | 100 | 100 | 100 |

Examples 10s to 10v demonstrate the use of combined non-ionic/cationic surfactants.

| Ingredient | Example 10s(i) % w/w | 10s(ii) % w/w | 10s(iii) % w/w | 10s(iv) % w/w | 10s(v) % w/w | 10s(vi) % w/w |
|---|---|---|---|---|---|---|
| Creosote (AS1604-2012) | 19 | 19 | 19 | 19 | 19 | 19 |
| Synthecol CAB (cocoamido propylbetaine CAS 61789-40-0) | 0.5 | 1 | 1.5 | 2 | 2.5 | 5 |
| ethoxylated sorbitan oleate | 0.5 | 1 | 1.5 | 2 | 2.5 | 5 |
| Water | 80 | 79 | 78 | 77 | 76 | 71 |
| Total | 100 | 100 | 100 | 100 | 100 | 100 |

| Ingredient | Example 10t(i) % w/w | 10t(ii) % w/w | 10t(iii) % w/w | 10t(iv) % w/w | 10t(v) % w/w | 10t(vi) % w/w |
|---|---|---|---|---|---|---|
| Creosote (AS1604-2012) | 19 | 19 | 19 | 19 | 19 | 19 |
| benzalkonium chloride | 0.5 | 1 | 1.5 | 2 | 2.5 | 5 |
| alkyl polyglucocide based on lauric acid | 0.5 | 1 | 1.5 | 2 | 2.5 | 5 |
| Water | 80 | 79 | 78 | 77 | 76 | 71 |
| Total | 100 | 100 | 100 | 100 | 100 | 100 |

| Ingredient | Example 10u(i) % w/w | 10u(ii) % w/w | 10u(iii) % w/w | 10u(iv) % w/w | 10u(v) % w/w | 10u(vi) % w/w |
|---|---|---|---|---|---|---|
| Creosote (conforming with AS1604-2012) | 19 | 19 | 19 | 19 | 19 | 19 |
| cetrimonium chloride | 0.5 | 1 | 1.5 | 2 | 2.5 | 5 |

-continued

| Ingredient | 10u(i) % w/w | 10u(ii) % w/w | 10u(iii) % w/w | 10u(iv) % w/w | 10u(v) % w/w | 10u(vi) % w/w |
|---|---|---|---|---|---|---|
| Castor oil ethoxylate (highly ethoxylated) | 0.5 | 1 | 1.5 | 2 | 2.5 | 5 |
| Water | 80 | 79 | 78 | 77 | 76 | 71 |
| Total | 100 | 100 | 100 | 100 | 100 | 100 |

| Ingredient | 10v(i) % w/w | 10v(ii) % w/w | 10v(iii) % w/w | 10v(iv) % w/w | 10v(v) % w/w | 10v(vi) % w/w |
|---|---|---|---|---|---|---|
| Creosote (conforming with AS1604 - 2012) | 19 | 19 | 19 | 19 | 19 | 19 |
| N,N-Didecyl-N,N-dimethyl-ammonium chloride | 0.5 | 1 | 1.5 | 2 | 2.5 | 5 |
| ethoxylated sorbitan oleate | 0.5 | 1 | 1.5 | 2 | 2.5 | 5 |
| Water | 80 | 79 | 78 | 77 | 76 | 71 |
| Total | 100 | 100 | 100 | 100 | 100 | 100 |

Example 11

In the exemplary solutions listed below, creosote was premixed with surfactant/solvent at a ratio of surfactant/creosote ratio not exceeding 1 to 19. The premixed product was combined with water at a ratio of 1 part product to 4 parts water and agitated under low to medium shear conditions.

Non-ionic surfactants

| Example | Chemical name | HLB | % active |
|---|---|---|---|
| 11a(i) | Cetyl-oleyl ethoxylate (2 mol EO) | 6 | >95 |
| 11a(ii) | C10-12 alcohol ethoxylate (7 mol EO) | 12.1 | >95 |
| 11a(iii) | C9-C11 alcohol ethoxylate (8 mol EO) | 13.7 | >95 |
| 11a(iv) | C10-12 alcohol ethoxylate (12 mol EO) | 14.4 | >95 |
| 11a(v) | Nonyl phenol ethoxylate (15 mol EO) | 15 | >95 |
| 11a(vi) | Castor oil ethoxylate (highly ethoxylated) | | >95 |
| 11a(vii) | Fatty amine oxide | | 33-35 |
| 11a(viii) | Alkyl polyglucocide based on lauric acid | | 50 |
| 11a(ix) | Sorbitan mono oleate (20 EO) | 15 | >95 |
| 11a(x) | Secondary alcohol ethoxylate | | >95 |

A number of different surfactants from different ionic charge groups were tested. These were tested at a level of 5% weight over weight with creosote. The surfactants were included as supplied, i.e., no account was made for the active level—rather, 5% w/w of the supplied surfactant was added. Non-ionic surfactants were also combined with cationic surfactants as a mixed emulsifier in subsequent tests.

Anionic surfactants

| Example | Chemical name | HLB | % active |
|---|---|---|---|
| 11b(i) | Sulfonated castor oil | | 75 |
| 11b(ii) | Calcium dodecyl benzene sulfonate in butanol | | 70 |
| 11b(iii) | Sodium dodecyl benzene sulfonate | | >95 |
| 11b(iv) | Morpholine oleate | | >95 |
| 11b(v) | Crisilic acid soap | | |

Cationic and amphoteric surfactants

| Example | Chemical name | HLB | % active |
|---|---|---|---|
| 11c(i) | Cocoamido propylbetaine | | 30-32 |
| 11c(ii) | Alkylpolyglycol ether ammonium methyl chloride | | |
| 11c(iii) | N,N-Didecyl-N,N-dimethylammonium chloride | | 80-82 |
| 11c(iv) | Benzylkonium chloride | | 50-52 |
| 11c(v) | Didecyldimethyl ammonium carbonate | | 48.5-51.5 |
| 11c(vi) | Cetrimonium chloride | | 25 |

Combined surfactants

| Example | Surfactant 1 | % w/w | Surfactant 2 | % w/w |
|---|---|---|---|---|
| 11d(i) | N,N-Didecyl-N,N-dimethylammonium chloride | 1 | | |
| 11d(ii) | N,N-Didecyl-N,N-dimethylammonium chloride | 0.8 | Castor oil ethoxylate (highly ethoxylated) | 0.2 |
| 11d(iii) | N,N-Didecyl-N,N-dimethylammonium chloride | 0.8 | C9-C11 alcohol ethoxylate (8 mol EO) | 0.2 |
| 11d(iv) | N,N-Didecyl-N,N-dimethylammonium chloride | 0.8 | C10-12 alcohol ethoxylate (7 mol EO) | 0.2 |
| 11d(v) | N,N-Didecyl-N,N-dimethylammonium chloride | 0.8 | Cocoamido propylbetaine | 0.2 |
| 11d(vi) | N,N-Didecyl-N,N-dimethylammonium chloride | 0.8 | C10-12 alcohol ethoxylate (12 mol EO) | 0.2 |
| 11d(vii) | N,N-Didecyl-N,N-dimethylammonium chloride | 0.8 | Fatty amine oxide | 0.2 |
| 11d(viii) | N,N-Didecyl-N,N-dimethylammonium chloride | 0.8 | Secondary alcohol ethoxylate | 0.2 |
| 11d(ix) | N,N-Didecyl-N,N-dimethylammonium chloride | 0.8 | Nonyl phenol ethoxylate (15 mol EO) | 0.2 |
| 11d(x) | N,N-Didecyl-N,N-dimethylammonium chloride | 0.8 | Sorbitan mono oleate (80 EO) | 0.2 |
| 11d(xi) | N,N-Didecyl-N,N-dimethylammonium chloride | 0.8 | Alkyl polyglucocide based on lauric acid | 0.2 |
| 11d(xii) | N,N-Didecyl-N,N-dimethylammonium chloride | 0.8 | Cetyl-oleyl ethoxylate (2 mol EO) | 0.2 |
| 11d(xiii) | Calcium dodecyl benzene sulfonate in butanol | 1 | | |
| 11d(xiv) | Cocoamido propylbetaine | 1 | | |

-continued

Combined surfactants

| Example | Surfactant 1 | % w/w | Surfactant 2 | % w/w |
|---|---|---|---|---|
| 11d(xv) | Castor oil ethoxylate (highly ethoxylated) | 1 | | |
| 11d(xvi) | Oleic acid | 0.7 | Morpholine | |
| 11d(xvii) | DDBSA | 0.74 | 50%NaOH | |
| 11d(xviii) | Morpholine | 1 | | |
| 11d(xix) | Fatty amine oxide | 1 | | |
| 11d(xx) | Secondary alcohol ethoxylate | 1 | | |
| 11d(xxi) | Nonyl phenol ethoxylate (15 mol EO) | 1 | | |
| 11d(xxii) | C10-12 alcohol ethoxylate (12 mol EO) | 1 | | |
| 11d(xxiii) | Sorbitan mono oleate (80 EO) | 1 | | |
| 11d(xxiv) | Alkyl polyglucocide based on lauric acid | 1 | | |
| 11d(xxv) | Castor oil sulfonate | 1 | | |
| 11d(xxvi) | Cetyl-oleyl ethoxylate (2 mol EO) | 1 | | |
| 11d(xxvii) | Benzylkonium chloride | 1 | | |
| 11d(xxviii) | Benzylkonium chloride | 0.8 | Castor oil ethoxylate (highly ethoxylated) | 0.2 |
| 11d(xxix) | Benzylkonium chloride | 0.8 | Crillet4 | 0.2 |
| 11d(xxx) | Benzylkonium chloride | 0.8 | Alkyl polyglucocide based on lauric acid | 0.2 |
| 11d(xxxi) | Benzylkonium chloride | 0.8 | Cocoamido propylbetaine | 0.2 |

Figure 2A:
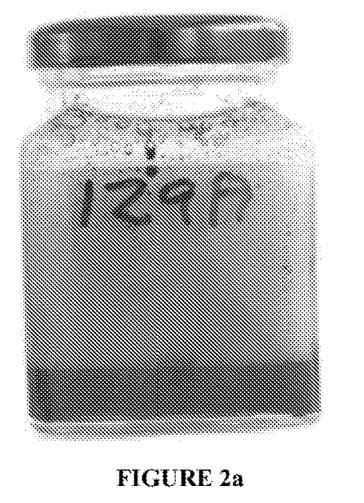
Figure 2B:
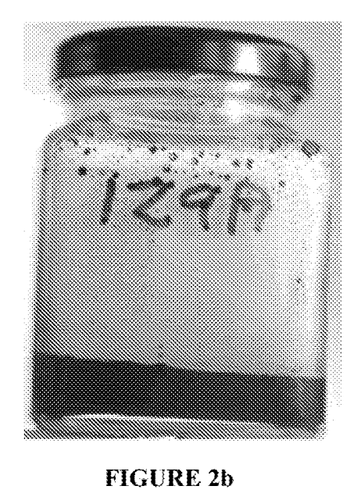
Figure 2C:
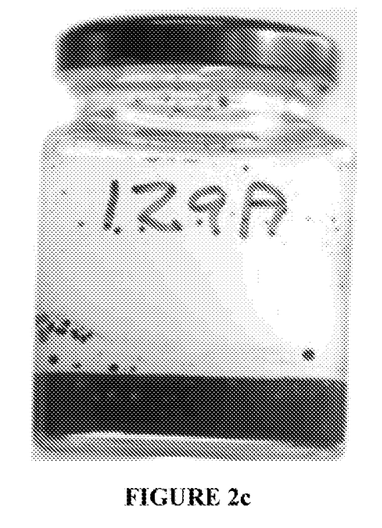
Figure 2D:
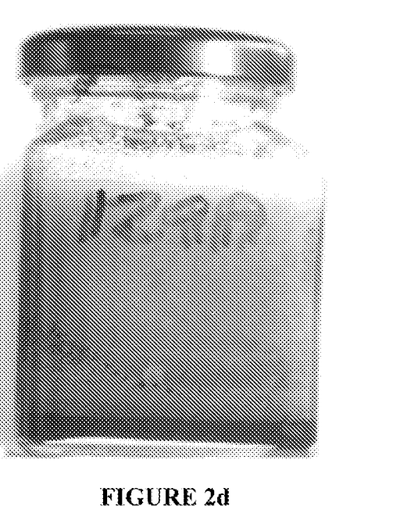
Figure 2E:
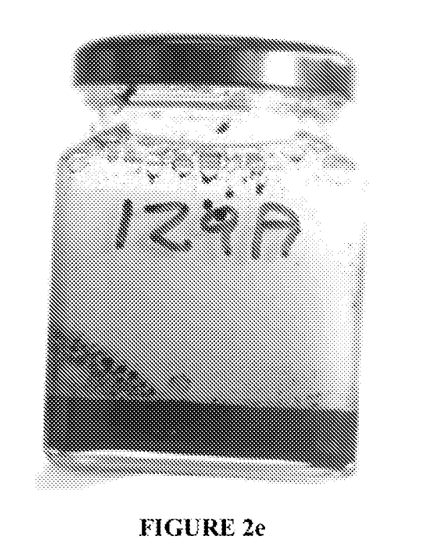

Sample 11d(i), being 1% w/w DDAC+19% w/w creosote was photographed 15 minutes after the addition of water (see, FIG. 2a), 1 hour after the addition of water (see, FIG. 2b), 24 hours after the addition of water (see, FIG. 2c), 1 minute after re-mixing following 24 hours of standing (see, FIG. 2d), and 15 minutes after re-mixing (see, FIG. 2e).

INDUSTRIAL APPLICABILITY

As related below, there are a range of issues associated with high temperature creosote. These are listed blow, along with a description as to how the disclosed formulations addresses each, in turn:

HTC is used hot, e.g., at 90° C. to treat timber. This requires heating of the working solution (i.e., neat creosote), jacketed cylinder and lagged pipe work. The present invention is advantageous in that inventive water-based product is used at ambient temperature in a conventional waterborne treatment plant. This saves energy, as well as reduces odour around treatment plant.

Hot creosote results in vapour emissions which present a safety issue to workers. Creosote is prone to causing skin sensitisation of workers who come in close and frequent contact with treated commodities. The present invention is advantageous in that the water-based product is used at ambient temperature (about 5 to about 60° C.), reducing creosote vapour emissions and odour.

High temperature creosote must be kept warm to prevent crystallisation of certain components. The present invention is advantageous in that the emulsion concentrate is stable at low temperature, i.e., crystallisation of components does not occur to any great extent.

HTC-treated timber is typically black, oily to touch. It often exudes viscous, black liquid that makes the timber difficult to handle. The present invention is advantageous in that the appearance of timber treated with the inventive water-based emulsion is considerably lighter than that of HTC-treated timber. Once dry, it is not oily to touch, nor has any timber showed signs of bleeding, even when exposed to direct sunlight on extremely hot days, e.g., daily temperature maximums of 45° C.

In conventional HTC processes, the use of solvent carriers is becoming increasingly regulated. The present invention is advantageous in that it uses water as the carrier; there are no VOC emissions resultant from the choice of carrier.

Although the invention has been described with reference to specific examples it will be appreciated by those skilled in the art that the invention may be embodied in many other forms. As such, reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. The particular features, structures or characteristics may be combined in any suitable manner, as would be apparent to one of ordinary skill in the art from this disclosure, in one or more embodiments.

In the description provided herein, numerous specific details are set forth. However, it is understood that embodiments of the invention may be practiced without these specific details. In other instances, well-known methods, structures and techniques have not been shown in detail in order not to obscure an understanding of this description. Thus, while there has been described what are believed to be the preferred embodiments of the invention, those skilled in the art will recognise that other and further modifications may be made thereto without departing from the spirit of the invention, and it is intended to claim all such changes and modifications as fall within the scope of the invention.

It will be appreciated that the above-described invention provides for an efficacious creosote-based wood preservative formulation that substantially does not bear the undesirable odour, toxicity and environmental disbenefits that characterise the more traditional HTC creosote treatments characterising the prior art.

The claims defining the invention are as follows:

1. A method of treating timber, the method comprising the steps of:
    selecting a timber substrate; and
    applying to the substrate an effective amount of a diluted preservative formulation concentrate comprising an oil-in-water macroemulsion or microemulsion of creosote in water,
    wherein the preservative formulation concentrate comprises creosote and at least two surfactants, a non-ionic surfactant and an anionic surfactant,
    wherein the non-ionic surfactant is ethoxylated castor oil, wherein the anionic surfactant comprises a calcium alkylbenzene sulfonate wherein the non-ionic surfactant is present in concentrate in an amount of from 1% to about 20% w/w, wherein the creosote is present in the concentrate in an amount of about 70% to about 95% w/w; and wherein the preservative formulation is at substantially ambient temperature.

2. A method according to claim 1, wherein the substantially ambient temperature is between about 5° C. and about 60° C.

3. A method according to claim 1, wherein the substantially ambient temperature is between about 17.5° C. to about 25° C.

4. A method according to claim 1, wherein the step of applying the preservative formulation, which is at substantially ambient temperature, is performed by means of dipping, brushing, spraying, misting, deluging or coating the surface area of the timber with the preservative formulation.

5. A method according to claim 1, wherein the timber comprises hardwood and/or softwood species.

6. A method according to claim 1, wherein the timber is pine posts and wherein the preservation is effected to nominal H5 (AS 1604.1-2012) standards.

7. A method according to claim 1, wherein the method comprises at least one vacuum step.

8. A method according to claim 7, wherein the at least one vacuum step is carried out between about 0 kPa and about −95 kPa.

9. A method according to claim 1, wherein the method comprises at least one pressure step.

10. A method according to claim 9, wherein the at least one pressure step is carried out between about 0 kPa and about +1450 kPa.

11. Preserved timber, when so-preserved by a method as defined in claim 1.

12. A preservative concentrate for the treatment of timber at substantially ambient temperature, the preservative comprising:
creosote present in the concentrate in an amount of about 70% to about 95% w/w; and
at least two surfactants comprising a non-ionic surfactant and an anionic surfactant, such that when the preservative is diluted with a predetermined quantity of water, the creosote is present as an oil-in-water macroemulsion or microemulsion; and
wherein the non-ionic surfactant is ethoxylated castor oil and the anionic surfactant comprises a calcium alkylbenzene sulfonate or sodium dodecylbenzene sulfonate; and
wherein the non-ionic surfactant is present in an amount of from 1% to about 20% w/w.

13. A timber preservative concentrate according to claim 12, wherein the anionic surfactant is calcium dodecylbenzene sulfonate present in the preservative concentrate in an amount of up to about 10% w/w.

14. A timber preservative concentrate according to claim 12, further comprising an anti-foaming agent and/or a fire retardant.

15. A timber preservative concentrate according to claim 12, wherein the anionic surfactant is calcium dodecylbenzene sulfonate present in the preservative in an amount of up to about 20% w/w.

16. A timber preservative concentrate according to claim 12, wherein the at least two surfactants further comprise at least one cationic surfactant.

17. A timber preservative formulation, the formulation comprising:
a predetermined amount of a timber preservative concentrate as defined according to claim 12, and
a predetermined amount of water;
wherein upon mixing, the creosote is present in the formulation in an amount of from about 15% w/w to about 40% w/w as an oil-in-water macroemulsion or microemulsion and provides for the treatment of timber at substantially ambient temperature.

18. A timber preservative formulation according to claim 17, wherein the predetermined amount of water is up to about 90% w/w with respect to the creosote.

19. A timber preservative formulation according to claim 17, wherein the amount of creosote in the formulation is up to about 25% w/w.

20. The timber preservative formulation according to claim 17, wherein the preservative is configured so as to not substantially form crystals at ambient temperatures.

21. The preservative concentrate of claim 12, wherein the ethoxylated castor oil has between about 30 mol and about 60 mol of ethylene oxide.

* * * * *